Dec. 7, 1926.
J. A. GEHRUNG
1,609,939
DETACHABLE MOTOR MOUNTER
Filed Dec. 1, 1924      2 Sheets-Sheet 1
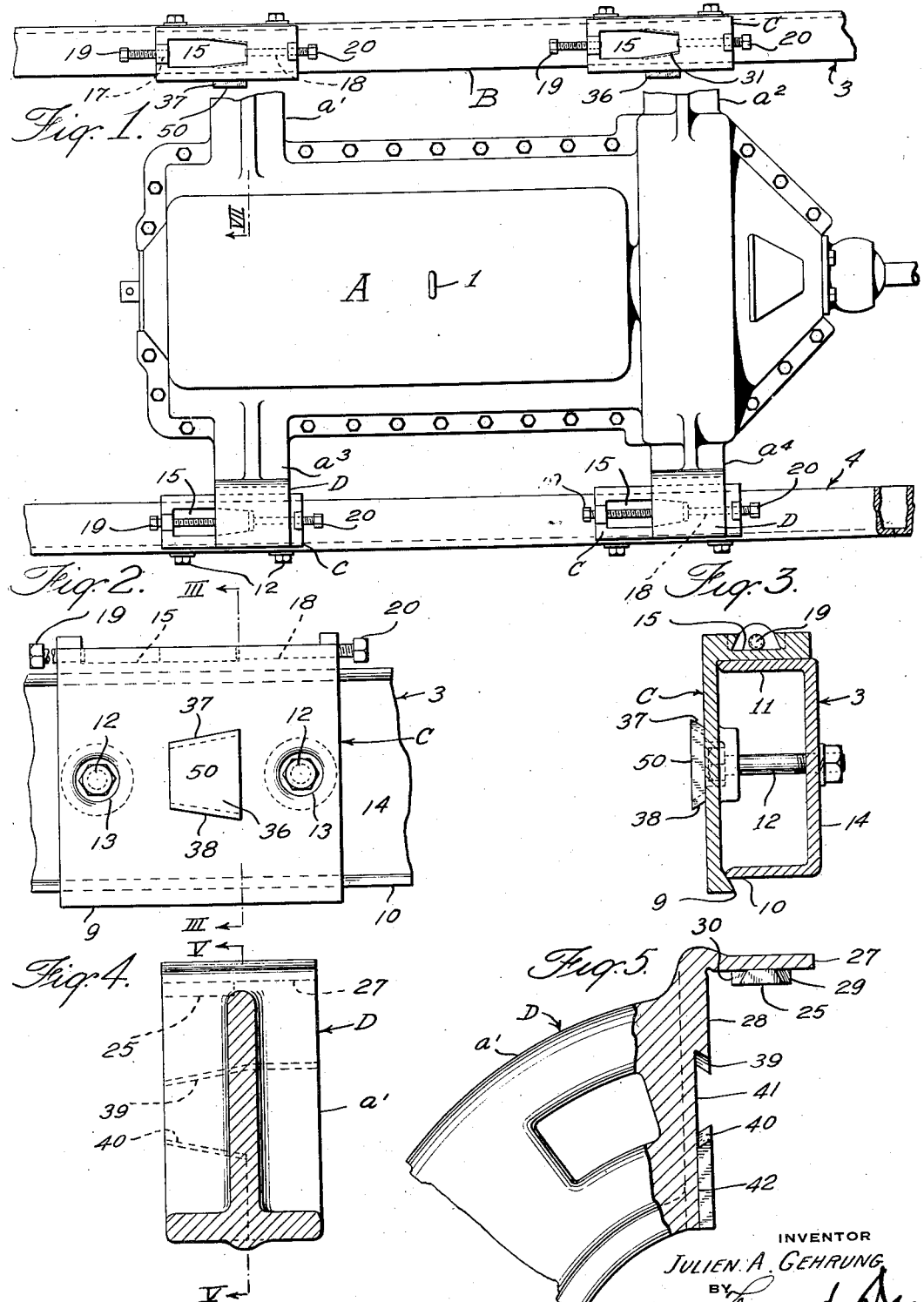

Dec. 7, 1926.
J. A. GEHRUNG
1,609,939
DETACHABLE MOTOR MOUNTER
Filed Dec. 1, 1924    2 Sheets-Sheet 2
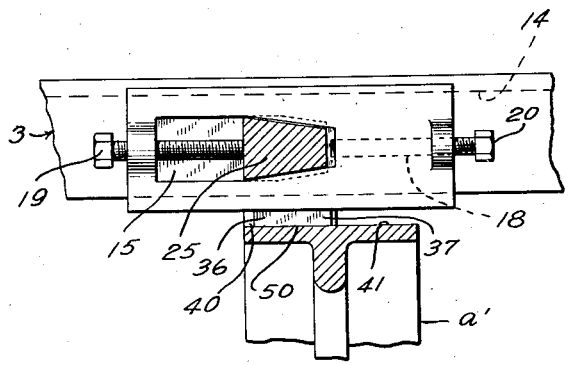
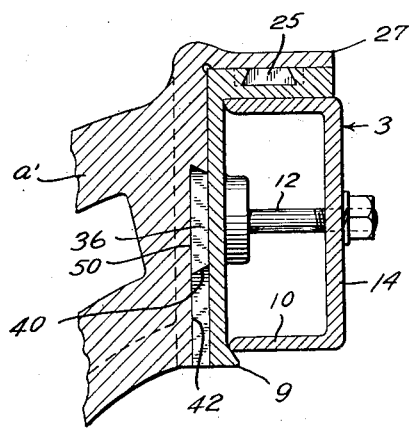
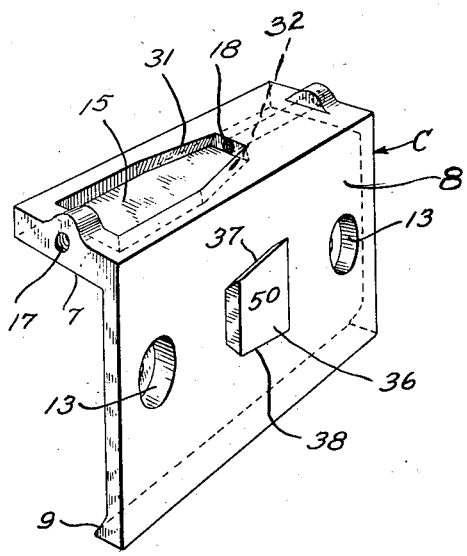
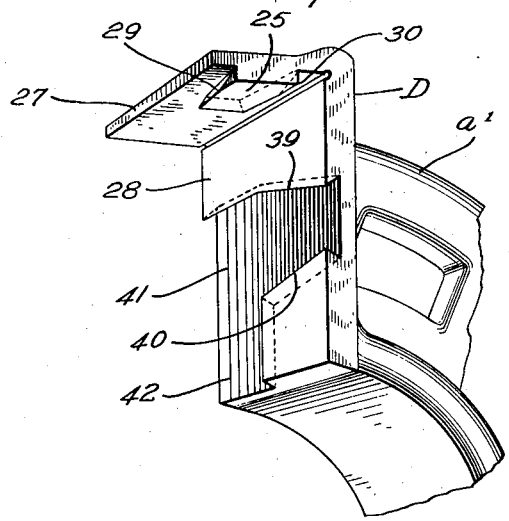
INVENTOR
JULIEN A. GEHRUNG.
BY
ATTORNEY Patented Dec. 7, 1926.

1,609,939

UNITED STATES PATENT OFFICE.

JULIEN A. GEHRUNG, OF NEW YORK, N. Y.

DETACHABLE MOTOR MOUNTER.

Application filed December 1, 1924. Serial No. 753,047.

This invention relates to motor mounting. It applies to the mounting of motors of the type employed in motor trucks, automobiles and aeroplanes.

The object of the invention is to provide a practically formed mounting attachment between a motor and its foundation which will permit the detachment and removal of the motor in its entirety and the re-mounting of another motor in its entirety with ease, quickness and dispatch. In the consideration of the invention, it is contemplated that the foundation for the motor is usually a chassis frame or a fuselage beam.

A further object of the invention is to provide means as a part of the mounting for a motor which will first sustain the weight of the motor and act as a guide for a bodily sliding movement of the motor, together with interlocking tongue and socket joints caused to be forced into interlocking relationship by this sliding movement of the motor, while the weight of the motor is being sustained. It is a further objective of the invention that the actual interlocking parts serve positively to anchor the motor upon its foundation and be freed from the duty of supporting the normal weight of the motor.

It is a still further object of the invention that direct acting means be provided functioning directly upon the separable parts of the tongue and socket joints, to effect their functioning. It is a further object of the invention to provide a complete assemblage involving the motor and its foundation to provide for the quick removal and mounting of a motor and the interchangeability of motor units upon the same foundation. It is appreciated that the motor is the weakest element of a motor driven machine, such as a truck, and unless a quick replacement of the motor can be effected, a loaded truck must be unloaded and its burden shifted to a fresh truck rushed to the scene of the breakdown in order to make possible the delivery of the goods under transit. Not only this, but the truck with the broken down motor must be towed to a repair station and the entire truck equipment thrown out of commission until the motor is repaired. In connection with the use of my invention, it is contemplated that a motor breakdown on the road would necessitate nothing but the supplying of a fresh motor which, through the use of my improvements, could be installed quickly on the road after the quick removal of the broken down motor. Thuswise, all that would be necessary would be carrying the broken down motor to the repair shop. In this way, a motor truck organization might comprise two or more motors so that the truck, as a vehicle, could be kept in constant service while its motors were being maintained in perfect order.

The above and further objects of the invention will better be understood by reference to the illustrative embodiment thereof to which the following claims are directed merely for purposes of illustration and which embodiment is described in the following specification in connection with the accompanying drawings which form a part hereof.

In the drawings, Fig. 1 is a plan view with parts broken away showing the invention; Figure 2 is a detail inside elevation of a foundation part;

Fig. 3 is a section taken along the plane of line III—III of Figure 2, looking in the direction of the arrows;

Fig. 4 is a cross-section through one of the motor supporting arms;

Fig. 5 is an elevation with parts shown in vertical section through the plane corresponding to line V—V of Figure 4, looking in the direction of the arrows;

Fig. 6 is a horizontal section partly in plan showing the assemblage of the tongue and socket joints;

Fig. 7 is a section through the plane corresponding to line VII of Fig. 1 looking in the direction of the arrow;

Fig. 8 is a perspective view of a foundation part; and

Fig. 9 is a perspective view of a motor part both of the mounting assemblage.

A complete motor block A which is hereinafter designated "motor" is to be understood as including all the mechanism customarily assembled as a single motor unit or block. It may or it may not include the gear case in addition to the power generating mechanism. In the block illustrated, it includes both such elements and is shown designed to be suspended by a hoist or shears from an eye bolt 1 positioned above the center of gravity of the structure. From this motor structure preferably project laterally a suitable number of supporting arms $a^1$, $a^2$, $a^3$ and $a^4$. These form a part of the removable motor assemblage. The foundation is designated generally by the letter B and in the present instance comprises a pair of parallel chassis beams 3 and 4 in the form of channel irons as is usual in truck construction. Each supporting arm $a^1$, etc. is made fast to the foundation by what I designate "a foundation part." This may conveniently take the form of a saddle clip C which has a horizontal ledge member 7 and a vertical member 8. The inner face of the vertical member 8 is preferably provided with a bevelled portion 9 to grasp the flange 10 of a chassis beam while the horizontal portion 7 overlies the top flange 11 of the chassis beam. A pair of attaching bolts 12 functioning through countersunk sockets 13 directly engage the web 14 of a chassis beam for the permanent assembling of the saddle-like foundation parts. The ledge 7 is provided with the countersunk joint socket 15 into opposite ends of which operatively open threaded screw bearings 17 and 18 carrying respectively the locking screw 19 and the unlocking screw 20. Each supporting arm, such as $a^1$, is fitted with a motor part D complementary to the foundation part C. For example, in Figure 9, the facing plate 28 is adapted to face against the plate 8 and to be guided thereby. Also the ledge 27 is adapted to overlie and slidably rest upon the face of the part 7. In the construction illustrated, a locking tongue 25 downwardly projects from the ledge 27 and is of a size to pass freely into the entrance portion of the socket 15. Its edge faces 29 and 30 are tapered and undercut in a complementary manner to and with corresponding faces 31 and 32 formed in one end of the socket 15. In dropping into place as the motor is lowered by the eye bolt 1, the tongue 25 passes freely down into the socket 15 until the ledge 27 rides on the underlying face of the part 7, these parts serving as a support for the part of the motor weight carried by the arm $a^1$. When thus dropping into place, note should be taken of the fact that the vertical face 8 is also provided with an outstanding locking tongue 36 having tapered undercut edge faces 37 and 38 complementary to and with corresponding undercut tapered faces 39 and 40 formed on the motor part 28 as a part of the socket 41. As the motor is dropped into place, the clearway 42 of socket 41 permits the downward movement of the motor part D without the tongue 36 catching upon anything. When in this position, a sliding movement of the motor part D which may be urged directly by the screw 19 forces both the joints 15—25 and 36—41 into interlocking relation. The edge dimension of each of the tongues 25 and 36 is at right angles one to the other so as to provide for maximum strength by one socket or the other in all transverse directions regardless of how the stresses may be distributed from the mass of the motor. It should be understood that the screws 19 and 20 play no part in resisting any of the lateral stresses imparted from the motor but merely function in holding the tongue and socket joints together or in opening them. The parts described in detail for the one supporting arm $a^1$ may be and are shown identical for all the other supporting arms $a^2$, etc., it being understood that a sufficient number of such supporting arms with their interlocking parts are to be provided as is required properly to support the weight of the motor and to resist stresses which its use may make inevitable. When more than two are employed, as is shown in this embodiment, the slidable parts of the motor mounting function most readily as guiding means to constrain it, the mounting movement of the motor to be parallel to itself, eliminating all possibility of jamming. In actual use, the release screws 20 would probably be employed merely to start the opening of the tongue and socket joints, the complete release of which is easily effected by sliding the motor into releasing position on the saddles.

Although I have shown tongue and socket joints arranged in planes at right angles to each other, whereby I obtain a tightening effect due to the undercutting or bevelling of the tapered faces in two directions, I well understand that any kind of a bevel to the faces of the tongue and socket joints in addition to that shown may be employed, although it is not necessary to the functioning of my invention and my preferred form is that shown. What I contemplate is that the elements of the beveled surfaces 37 and 38 now shown need not be all parallel to the face 8. It is contemplated that the tongue and socket might be fabricated so as to taper in all directions in which case the outer face 50 of tongue 36 would incline away from the face of the part 8 instead of being parallel to it.

The inventive thought may have a variety of expressions as is contemplated by what I claim and desire to secure by United States Letters Patent as follows:

1. In combination with a motor and a motor-foundation, mounting means comprising a pair of motor-parts fixed relatively on opposite sides of said motor and a pair of foundation-parts fixed relatively to said foundation, said respective motor-parts and foundation-parts providing mutually cooperating faces relatively slideable without altering the elevation of said motor and adapted to carry the weight of said motor; and wedging tongue and socket joints formed partly in each said motor-part and partly in each said foundation-part and adapted to interlock and to release in response to a sliding movement of said motor when its weight is sustained by said mutually cooperating faces.

2. In combination with a motor and a motor-foundation, mounting means comprising a pair of motor-parts fixed relatively on opposite sides of said motor and a pair of foundation-parts fixed relatively to said foundation, said respective motor-parts and foundation-parts providing mutually cooperating faces relatively slideable without altering the elevation of said motor and adapted to carry the weight of said motor; and wedging tongue and socket joints formed partly in each said motor-part and partly in each said foundation-part and adapted to interlock and to release in response to a sliding movement of said motor when its weight is sustained by said mutually cooperating faces; and means tending to hold said tongue and socket joints in locked condition.

3. In combination with a motor and a motor-foundation, mounting means comprising a pair of motor-parts fixed relatively on opposite sides of said motor and a pair of foundation-parts fixed relatively to said foundation, said respective motor-parts and foundation-parts providing mutually cooperating faces relatively slideable without altering the elevation of said motor and adapted to carry the weight of said motor; and wedging tongue and socket joints formed partly in each said motor-part and partly in each said foundation-part and adapted to interlock and to release in response to a sliding movement of said motor when its weight is sustained by said mutually cooperating faces; and local means for applying and unlocking force directly to the parts of a tongue and socket joint.

In witness whereof, I have signed my name to this specification, this 20th day of November, 1924.

JULIEN A. GEHRUNG.